United States Patent [19]

Holcomb et al.

[11] Patent Number: 4,587,739
[45] Date of Patent: May 13, 1986

[54] GAGE FOR MEASURING DISPLACEMENTS IN ROCK SAMPLES

[75] Inventors: David J. Holcomb; Michael J. McNamee, both of Albuquerque, N. Mex.

[73] Assignee: The United States of America as represented by the United States Department of Energy, Washington, D.C.

[21] Appl. No.: 756,127

[22] Filed: Jul. 18, 1985

[51] Int. Cl.$^4$ .............................................. G01B 7/16
[52] U.S. Cl. ............................... 33/143 L; 33/178 E; 33/550
[58] Field of Search ............ 33/143 L, 143 D, 143 F, 33/147 D, 147 H, 178 E, 178 D, 178 R, 550, 552

[56] References Cited

U.S. PATENT DOCUMENTS

| | | | |
|---|---|---|---|
| 470,912 | 3/1892 | Durand | 33/550 |
| B 540,888 | 3/1976 | Albertazzi | 33/143 F |
| 3,648,377 | 3/1972 | Witzke | 33/178 E |
| 4,240,206 | 12/1980 | Baresh et al. | 33/178 E |

Primary Examiner—Willis Little
Attorney, Agent, or Firm—James H. Chafin; Albert Sopp; Judson R. Hightower

[57] ABSTRACT

A gage for measuring diametral displacement within a rock sample for use in a rock mechanics laboratory and in the field, comprises a support ring housing a linear variable differential transformer, a mounting screw, and a leaf spring. The mounting screw is adjustable and defines a first point of contact with the rock sample. The leaf spring has opposite ends fixed to the inner periphery of the mounting ring. An intermediate portion of the leaf spring projecting radially inward from the ring is formed with a dimple defining a second point of contact with the sample. The first and second points of contact are diametrically opposed to each other. The LVDT is mounted in the ring with its axis parallel to the line of measurement and its core rod received in the dimple of the leaf spring. Any change in the length of the line between the first and second support points is directly communicated to the LVDT. The leaf spring is rigid to completely support lateral forces so that the LVDT is free of all load for improved precision.

11 Claims, 9 Drawing Figures

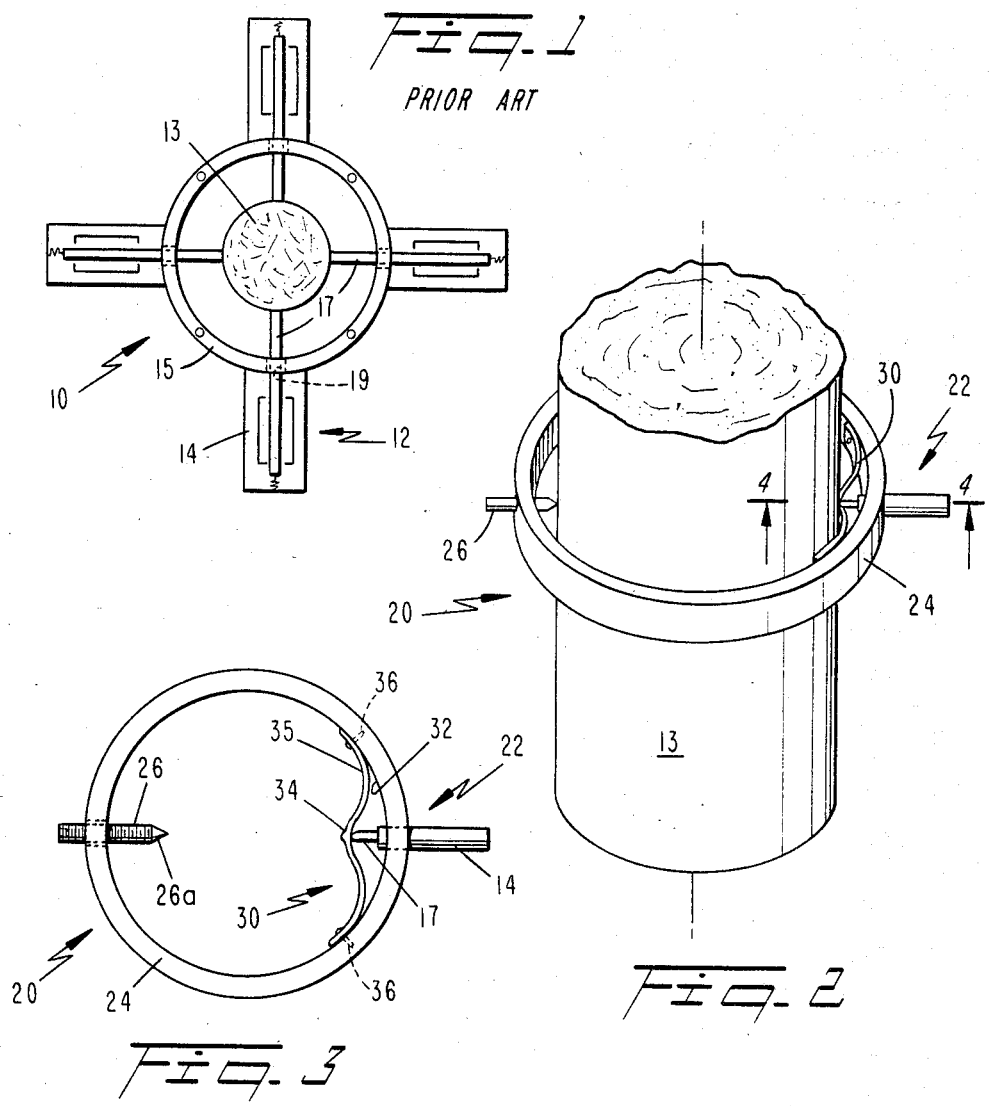
Fig. 1 PRIOR ART
Fig. 2
Fig. 3
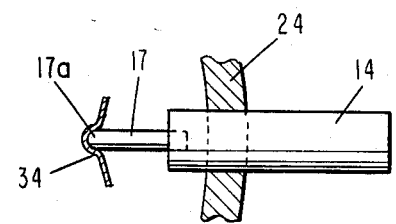
Fig. 4
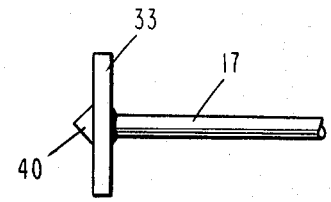
Fig. 5

GAGE FOR MEASURING DISPLACEMENTS IN ROCK SAMPLES

BACKGROUND OF THE INVENTION

The U.S. government has rights in this invention pursuant to Contract No. DE-AC04-76DP00789 between the United States Department of Energy and AT&T Technologies, Inc.

The present invention relates generally to gages used for lateral deformation measurements in rock mechanics testing and, more particularly, to a gage having a linear variable differential transformer for measuring diametral displacements in rock samples.

Determination of the mechanical properties of rock requires deformation measurements over ranges from a fraction of a micrometer to centimeters. Required sensitivity is greatest when the moduli of rock are to be determined. For most rock types, the Young's Modulus is between 6 and 60 GPa, and the Poisson ratio is 0.1 to 0.3. For example, with a Young's Modulus of 60 GPa and a Poisson ratio of 0.3, 100 MPa of uniaxial stress, applied to a typical rock sample diameter of 2.5 centimeters, would result in displacements of 42 micrometers in a direction parallel to the stress and 13 micrometers in the radial, perpendicular direction. Corresponding strains would be 1660 and 500 microstrains, respectively. Acceptable determination of moduli would probably require that strain or displacement be measured within 10%, implying a necessary accuracy of 1.3 micrometers or 50 microstrains.

Several factors complicate the gaging problem. First, geological materials are often inhomogeneous on a scale of centimeters or more. Also, specimens may be fluid saturated, requiring a measurement device to be insensitive to moisture or be capable of being applied through a jacket. For a common triaxial test, where pressure is applied to the sample by a fluid medium, the sample must have an impervious jacket. Finally, for lengthy test series involving dozens of samples, there is a need for a gage that is easy to install and re-usable.

Three classes of gages are used for deformation measurements on rock: strain gages applied to the sample or a jacket, clip-on gages of various types that use a cantilever to tranfer displacement to a strain gage, and LVDT (linear variable differential transformer) gages.

Strain gages have excellent sensitivity and are very compact. For example, if the specimen is homogeneous with a smooth, dry surface, then strains of about $2 \times 10^{-6}$ can be measured. However, elaborate precautions are required to reach that accuracy. For routine testing, accuracy is probably more on the order of one part in $10^{-4}$.

There are a number of difficulties in the use of strain gages. If the material is not homogeneous on a scale that is smaller than the gage dimension (typically one or two centimeters), then the strain measured is a local phenomenon. Also, if there are large pores, such as are found in volcanic tuffs, then a strain gage cannot be used. Strains in excess of one percent are difficult to measure reliably with strain gages and measurement of large strains under cyclic loads is usually not possible. In the field, measurements with strain gages are doubly difficult because the surfaces are usually rough and wet and working conditions are such that the care and delicacy required to install strain gages are difficult to achieve. When testing is done under pressure, all problems are compounded by the impermeable jacket required to exclude the pressurization fluid from the sample. If the gage is mounted on the exterior of the jacket, the jacket must be made to conform closely to the specimen before mounting the gage. A common technique used is to compress thin copper foil or tubes onto the sample under 50 MPa of pressure. This works well if the sample has no large pores and If the initial hydrostatic compression effects can be ignored. If the sample or jacketing is such that the gage must be applied to the surface, the wiring must pass through the jacket without leakage.

Contact between the jacket and the gage is also a matter of concern. Strain gages are affected by fluid pressure, partially by pressure-induced changes in resistivity and gage dimensions and partially by pressure on adhesive used to mount the gage. At 100 MPa, the apparent strains induced are on the order of 50 to 100 microstrains, with the actual value depending on gage type and manufacturing batch, mounting material and method, sample surface curvature and gage material. The proper pressure correction can be determined only empirically using the desired gage type, adhesive and material. Finally, because the strain gage is not re-usable, maintenance and installation costs are high.

Cantilever gages use strain gages as a sensing element, with rock displacement transmitted by a mechanical connection between the sample and cantilever. However, cantilever gages tend to be awkward devices requiring precision machining. Also, although cantilever gages are useful for measuring large strains, measurement of small sample strains (e.g., $10^{-4}$ or less) is often impractical since the actual strain in the strain gage becomes less than a microstrain. In practice, it is difficult to calibrate the cantilever gage for small strains due to hysteresis and lack of repeatability.

Linear variable differential transformers (LVDTs) have been successfully used for measuring displacements parallel to the axis of samples but have not often been used for measurements in the diametral direction. For tests conducted in a pressure vessel, there is usually little space between the sample and the vessel walls. An LVDT requires at least 2 centimeters if it is mounted with its axis parallel to the diameter of the sample. Assuming that there is sufficient space, it is necessary to mount the LVDT so that it is firmly supported on the sample, yet free to respond to sample deformations. Apart from these problems, the LVDT is nearly an ideal displacement sensor. It is linear over ranges from a micrometer up to several centimeters, has little sensitivity to pressure or temperature and is reasonably rugged.

In an article entitled "The Effects of Size and Stress Concentration on the Dilatancy and Fracture of Rock", by S. K. Bordia, published in *Int. J. Rock Mech. Min. Sci.*, (Vol. 8, 1971), there is disclosed a typical mounting arrangement for LVDTs when used for measurements in the diametral direction. Generally; LVDTs are fixed to a mounting ring at diametrically opposed positions with their support rods connected to an internally spring-loaded core within the LVDT barrel passing through the ring to provide point contact with the sample. However, due to the delicacy of the LVDT, the internally spring-loaded core can support only small forces perpendicular to its axis and is not well suited to supporting any lateral loads and support forces as tends to occur.

SUMMARY OF THE INVENTION

It is accordingly one object of the present invention to provide a gage for accurately measuring diametral strain in rock samples.

Another object of the invention is to provide a gage that is easily mounted to the rock sample.

Yet another object is to provide a gage that exhibits little or no sensitivity to pressure and ambient temperature.

Still a further object is to provide a gage that can be mounted to the test specimen at two points between which diametral displacement is measured with a linear variable differential transformer free of support loads and lateral forces acting in a direction normal to the LVDT axis.

Another object is to provide a gage capable of measuring both large and small strains in a test specimen.

Still another object is to provide a displacement gage capable of reliable use in rugged and hostile environments, such as rough and wet field testing conditions.

Still another object is to provide a gage that is re-usable.

Additional objects, advantages and novel features of the invention will be set forth in detail in part in the description which follows and in part will become apparent to those skilled in the art upon examination of the drawing, or may be learned by practice of the invention. The objects and advantages of the invention may be realized and maintained by means of the instrumentalities and combination particularly pointed out in the appended claims.

A gage for measuring displacements in rock samples in accordance with the invention comprises a support ring having an inner diameter slightly greater than the diameter of the test specimen. The gage is mounted to the test specimen at two points between which displacement is to be measured. One contact point with the specimen is by means of an adjustment screw. At the other point, contact is through an attachment device fixed to the ring for engagement with the test specimen. The attachment device cooperates with the adjustment screw to support the ring on the specimen by being generally immovable in a direction perpendicular to the plane of the ring. The attachment device is yieldable diametrically by a distance equal to the change in specimen diameter caused by strain.

Strain is measured by means of an LVDT mounted to the ring with its axis parallel to the line of measurement. The spring-loaded core of the LVDT is responsive to flexure of the attachment device in the diametral direction to produce a variable signal in proportion to strain. The attachment device isolates the LVDT core from support forces and lateral forces acting in a direction perpendicular to the core axis.

Preferably, the attachment device is a leaf spring having opposite ends fixed to the inner periphery of the ring and an intermediate portion projecting radially inward. The intermediate portion includes a dimple defining the second contact point. A rod connected co-axial to the core extends between the leaf spring and inner periphery of the ring so that a free end of the rod is received within a depression of the leaf spring formed directly behind the dimple.

To function properly, opposite end portions of the leaf spring must be convex relative to the inner periphery of the ring extending between the end portions. The intermediate portion is concave.

To minimize thermal expansion of the gage tending to affect accuracy of measurement, the rod and adjustment screw are preferably formed of a material having a higher coefficient of thermal expansion than the ring so that expansion in opposite directions tends to cancel, nullifying thermal distortion.

For measuring diametric displacement in large diameter specimens, the intermediate portion of the leaf spring preferably includes a point of predetermined length soldered to the spring, rather than a small dimple. Thus, changes in sample diameter are accurately transmitted to the LVDT core, without requiring a support load to be borne by the LVDT.

BRIEF DESCRIPTION OF THE DRAWING

FIG. 1 is a top plan view of a prior art measuring gage employing LVDTs for lateral strain measurement;

FIG. 2 is a perspective view of an LVDT displacement gage in accordance with the present invention;

FIG. 3 is a top plan view of the LVDT displacement gage of FIG. 2;

FIG. 4 is a sectional view taken along the line 4—4 of FIG. 2;

FIG. 5 is a view similar to FIG. 4 showing an alternative embodiment of a contact point structure providing contact between the test specimen and leaf spring.

DETAILED DESCRIPTION OF THE INVENTION

Figure 6:
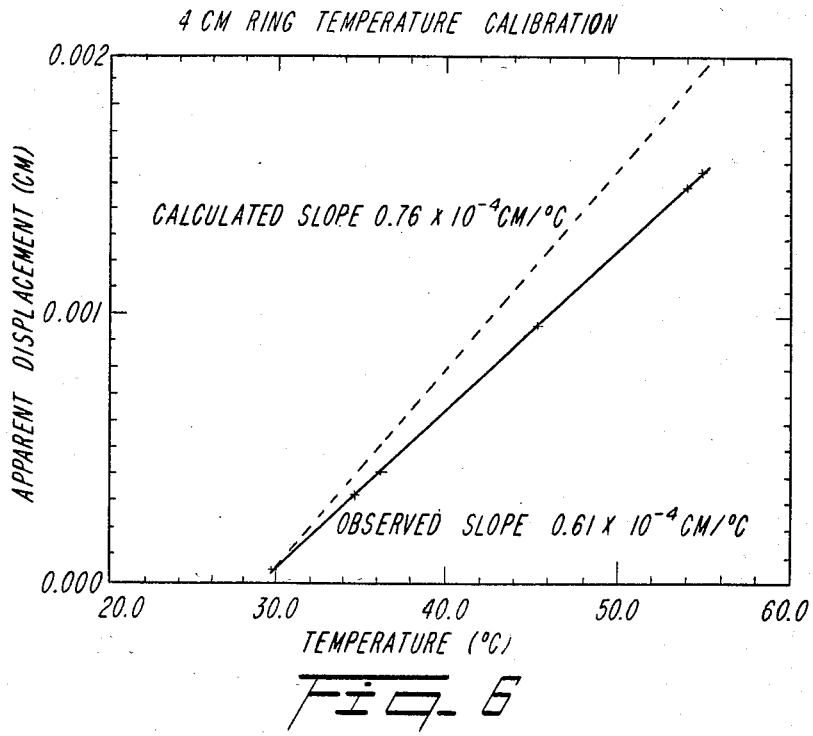
FIGS. 6–9 are graphs depicting the results of experimentation for determining thermal correction factors and pressure effects for ring gages of predetermined size and material.

FIG. 1 is an illustration of a prior art displacement gage 10 employing plural linear variable differential transformers (LVDTs) 12 for measuring lateral strain in rock specimens 13. The construction of an LVDT is well known, and generally comprises a barrel housing 14 in which a free-floating, spring-loaded core (not shown) translates along its longitudinal axis in relation to primary and secondary induction coils. The barrel housings 14 are fixed to the outer periphery of a steel support ring 15 at equispaced angular intervals from each other. Each core is connected to a rod 17 movable with the core. Each rod 17 passes through an aperture 19 formed in support ring 15 and projects radially inward into contact with specimen 13.

Changes in sample diameter are transmitted to the LVDT cores through the rods 17. However, since rods 17 support ring 15 and LVDTs 12 on sample 13 under the bias of the internally spring-loaded cores, large support forces tend to act upon these cores in a direction perpendicular to the core axes. Since the spring-loaded cores are delicate instruments not well suited to supporting any lateral load, precision in lateral displacement measurement is compromised, tending to affect reliability of the gage, particularly when employed to measure small amounts of diametric deformation on the order of microstrains.

Referring to FIGS. 2–5, displacement gage 20 having an LVDT 22 as a sensing element has been developed for determining diametric strains in rock samples under conditions of uniaxial stress or triaxial stress. As shown in FIG. 2, gage 20 comprises a support ring 24 having an inner diameter slightly larger than the sample to be tested. The thickness of ring 24 is about one to two centimeters. To conserve space, however, the thickness of ring 24 can be reduced considerably.

To attach ring 24 to sample 13, an adjustment screw 26 is threaded into one side of the ring and projects radially inward from the inner periphery to provide a fixed point of contact. Depending upon the material to be tested and jacket type, tip 26a of screw 26 may be either rounded or pointed.

As best depicted in FIG. 3, LVDT barrel 14 is mounted in a threaded hole drilled into ring 24, diametrically opposed to adjustment screw 26. To support gage 20 upon specimen 13, a leaf spring 30 is attached to the inner periphery 32 of ring 24 and includes at a center portion thereof a dimple 34 projecting radially inward from the spring to provide point contact with specimen 13. LVDT control rod 17 extends from barrel housing 14 along the diametrical measurement axis defined by adjustment screw 26 and dimple 34. The control rod 17 includes free end 17a fixed within a depression formed by dimple 34 on a rear surface of leaf spring 30. The rod 17 extends into the barrel housing 14 where it is threaded to the LVDT core to in sample 13 caused by strain.

Leaf spring 30 in cooperation with adjustment screw 26 provides a secure mount for support ring 24 and LVDT 22 since it is characteristically capable of bearing support loads without moving in a direction perpendicular to the plane of support ring 24. Leaf spring 30 is also capable of bearing reasonable lateral loads (acting in a direction perpendicular to the diametrical support axis within the plane of ring 24) with little or no flexure. By its nature, however, leaf spring 30 is readily yieldable in the diametral direction to accurately transmit changes in sample diameter communicated to LVDT 22 through connect rod 17. Because of the aforesaid stiffness characteristics of leaf spring 30, LVDT 22 and particularly connect rod 17 thereof is left free of all load and only moves in response to flexure of the leaf spring in the diametral direction so that its precision is uncompromised.

To function properly opposite end portions 35 of the leaf spring are preferably convex and bowed outward toward the inner periphery of the support ring extending between points of attachment 36. The center portion of leaf spring 30 is concave so that dimple 34 formed thereon provides point contact with sample 13.

Accuracy of gage 20 is independent of spring 30 since LVDT 22 contacts the sample at the same point (i.e., dimple 34) as does the spring. In addition, since the LVDT core is rigidly supported by its attachment point 17a to the leaf spring, the core is capable of translating axially without cocking or rotating, thus eliminating a major source of error in LVDTs.

Leaf spring 30 may be hand formed from 1095 carbon steel spring stock, then drilled and dimpled before heat treating. Heat treating is accomplished by heating the spring in a salt bath for about half an hour at approximately 830 degrees centigrade, oil quenching and then tempering for an hour at about 340 to 400 degrees centigrade. Tempering reduces the hardness to about 48–50 RC. More sophisticated forming processes can be devised, but are not really necessary as the spring does not enter into gage performance. All that is required of spring 30 is sufficient spring force to mount the ring on sample 13.

Mounting the support ring 24 on sample 13 is easy since adjustment screw 26 can be backed out to provide ample clearance. After ring 24 is mounted on sample 13, it is necessary to adjust the position of the LVDT core since an IVDT has a physical null point where the coupling core is centered between the two transformer coils. Linearity is assured for a specified distance on either side of that point. For small ranges, where the total allowed displacement is only +0.01 centimeters, it can be difficult to set the core initially to the proper position. However, the design of ring 24 makes the adjustment simple since a crude adjustment to the proper position can first be made by moving the LVDT barrel. Final positioning to the desired operating point is then made by turning the adjustment screw while the ring is mounted on the sample.

Ring sizes can vary from a few centimeters to as large as desired. Rings as large as 30 centimeters have been constructed. Machining is uncritical, requiring only that adjustment screw 26 and the LVDT mounting hole have a common axis. Once LVDT 22 is calibrated for use with one ring size, it can be moved to another ring size with no need for recalibration. Calibration is made by using a micrometer head to move the core in and out the barrel, while adjusting the signal amplifier (not shown) to the desired gain.

If there is sufficient space to allow use of LVDT ring gage 20, then it has many advantages. For example, sensitivity of the LVDT 20 is comparable to a strain gage. Measured displacements by LVDT 20 are an average of the strain over the sample diameter so that local inhomogeneities are averaged to some extent. Because the gage is mechanically coupled to the sample, the complications of the gage-adhesive-sample interface encountered with strain gages are avoided. Further, there is no need to pre-seat a jacket, as is done with copper jackets before applying strain gages. By stacking several gages 20 with the measurement axis along suitable diameters, the strain tensor is easily measured. Further, gage 20 is indifferent to surface conditions, such as roughness or moisture. As an example, strain relaxation on freshly retrieved, saturated cores can be commonly measured using ring gage 20. This is a rather stringent test, because the strains to be measured are in the 100 microstrain range and the gage must be applied immediately to the wet, as cored surface. Finally, gage 20 is completely re-usable and mechanically rugged.

FIG. 5 is an illustration of a modification made to leaf spring 30 for accommodating large diameter rock specimens 13. Central portion 33 of lear spring 30 is formed smooth, without dimple 34. Instead, a point 40 is soldered to central portion 32 to project radially inward into point contact with the specimen 13.

LVDT displacement gage 20 is susceptible to two primary sources of systematic error: pressure contraction and thermal expansion. Similar errors due to changes in the dimension of the mounting device are present in most if not all indirect gages.

For LVDT ring gage 20 analysis of thermal and pressure effects is straightforward. There are three mechanical elements to consider: the ring 24, the adjusting screw 26 and the rod 17 connecting the LVDT core to the spring dimple 34 (see FIG. 3). The spring 30 itself contributes essentially nothing except for changes in its thickness, which are negligible in a first approximation. Assuming that compressional strains in the sample 13 are positive, an increase in temperature causes all elements to expand. Since expansion of mounting ring 24 makes sample 13 appear smaller, the apparent strain is compressional for a temperature increase in the ring. Conversely, thermal expansion of connecting rod 17 and adjusting screw 26 cause the sample 13 to appear larger. For a ring diameter $D_{ring}$, rod length $1_r$ and adjusting screw length of $l_s$, an increase in temperature $\Delta T$ causes an apparent change ($\Delta D_{sample}$) in sample diameter of $$\Delta D_{sample} = \Delta T(\alpha_{ring} D_{ring} - \alpha_{rod} l_r - \alpha_{screw} l_s) \quad (1)$$

where the alphas are thermal expansion coefficients. Because thermal expansion of rod 17 and screw 26 is opposite that of the ring 24, compensation for thermal expansion can be made by appropriate choice of materials for the ring and the adjusting screw or rod. As an example of the magnitude of the thermal expansion, consider a 1° C. rise in temperature for a 5 centimeter ring of aluminum ($\alpha = 23 \times 10^{6°}$ C.$^{-1}$). Assuming a steel rod and adjusting screw with a total length of 2 centimeters and a coefficient of expansion of $10 \times 10^{-6°}$ C.$^{-1}$, then the apparent decrease in sample diameter is $0.95 \times 10$ centimeters per 1° C. For a sample dimension of 2.5 centimeters, this corresponds to an apparent compressional strain of 37 microstrains per °C. Comparison with the requirements for accuracy discussed above shows that corrections must be made for thermal fluctuations greater than 1°.

By experimentation, the thermal time constant for 5 centimeter rings is abut 15 minutes. If a test is completed within a few minutes, the ring will not exhibit temperature fluctuations. Otherwise, tests should be run slowly enough to retain thermal equilibrium. Room temperature fluctuations are usually larger than 1° C. so thermal effects can be important even for uniaxial testing. For triaxial testing, adiabatic heating of the pressurization fluid is the dominant effect. Temperature increases of up to 6° C. are observed during pressurization to 100 MPa using silicone oils. Thermal equilibrium of the entire pressure vessel then requires several hours. To avoid thermal effects under these conditions requires that pressurization be done either rapidly or slowly with respect to the thermal time constant of the ring. If done rapidly, no thermal corrections will be necessary for the pressurization phase. If done slowly, the ring temperature will be in equilibrium with the fluid, and a thermal correction can be applied. If done very slowly, (hours per 100 MPa), then the adiabatic heating will dissipate and no correction is necessary.

Figure 7:
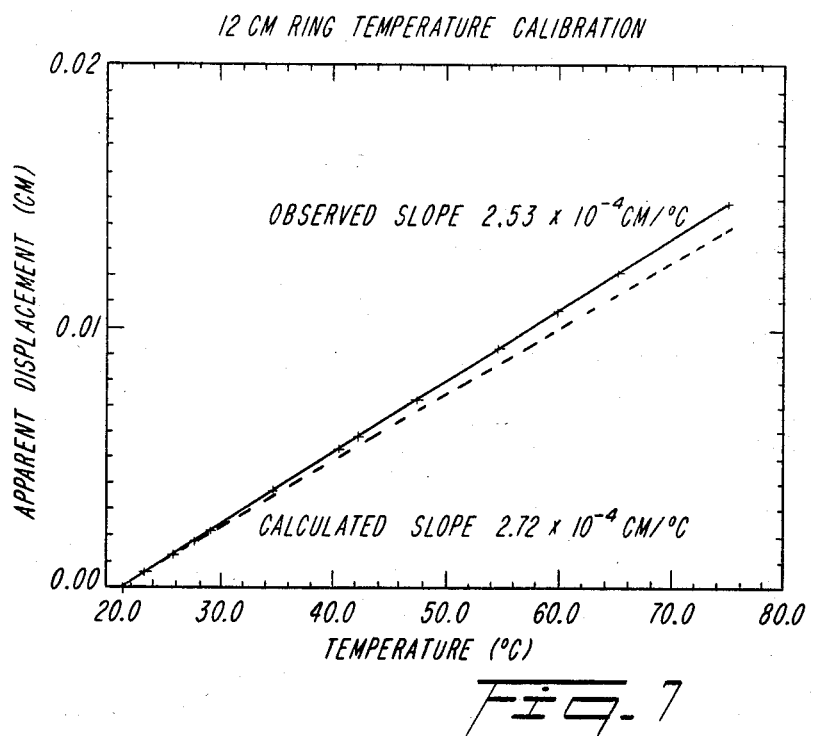

To determine a precise thermal correction factor for a ring gage, the sample 13 to be tested is replaced by a standard of the same size, with known, preferably low, thermal expansion and the assembly is heated in an oven over the relevant temperature range. FIGS. 6 and 7 show thermal calibrations for two gages, respectively, using a fused quartz rod standard ($\alpha_{fused-quartz} = 5 \times 10^{-7°}$ C.$^{-1}$). Calculated thermal effects (from equation 1 supra) are shown as a dotted line. Reasonable agreement is observed between the calculated and observed thermal effect. For the 12 centimeter gage (FIG. 7), a complete heating and cooling cycle is included in the calibration. No hysteresis was detectable.

Thermal effects can be reduced an order of magnitude by using an alloy such as Invar for which $\alpha_{Invar} \approx 1.5 \times 10^{6°}$ C.$^{-1}$. Of course, material costs are much higher for Invar than for aluminum. An alternative method is to use the expansion of the adjusting screw 26 and rod 17 to balance that of the ring 24. From equation 1 supra, it can be seen that by an appropriate choice of material for the rod and screw, with a somewhat higher coefficient of thermal expansion than that of the ring, it is possible to null out the thermal effects. For small rings, where the adjusting screw and rod comprise nearly half the diameter of the ring, a steel ring ($\alpha \approx 10 \times 10^{-6°}$ C.$^{-1}$) and an aluminum or brass screw and rod would work well. For larger rings, where the rod and screw lengths are a smaller fraction of the ring diameter, it is difficult to obtain a sufficient contrast in expansivities, the ability of the ring to expand without using a low expansivity alloy such as Invar for the ring. For precise work it is preferable to null as much thermal response of the ring as possible and then determine a calibration curve.

Because thermal effects are inherently linear over the small temperature ranges typically encountered, correction is simple. All that is required is that the ring temperature be recorded along with the rest of the test data. Because of the thermal mass of the ring, its temperature should be measured by a thermocouple located in a small hole in the ring. This is particularly important for tests where the ring is exposed to air, since an exposed thermocouple will record rapid fluctuations of air, rather than those of the more sluggish ring temperatures. Care should be taken to avoid short circuiting the thermocouple at the entry to the hole, as the thermocouple would record the temperature at the shorting point.

Under pressure, as in a triaxial test, the ring contracts, causing the sample to appear larger, while the pressure-induced contraction of the rod and adjusting screw causes the sample to appear smaller. Because the stress is hydrostatic, and assuming that the ring materials are isotropic, linear strains in all elements will be equal to $\frac{1}{3}$ of the volume strain which is proportional to the bulk modulus, K. For a pressure increase $\Delta P$, the linear strain in each element is $$\epsilon = \Delta P / 3K$$

Thus the apparent change in sample size (compression positive) from the effect of all three elements is $$\Delta D_{sample} = \Delta P(-\Delta D_{ring} + \Delta L_{rod} + \Delta L_{screw}) \quad (2)$$

$$\Delta D_{sample} = \Delta P\left(\frac{-D_{ring}}{3K_{ring}} + \frac{L_{rod}}{3K_{rod}} + \frac{L_{screw}}{3K_{screw}}\right).$$

Using the same ring dimensions as in the thermal expansion example, assuming that the bulk modulus of aluminum is 73 GPa and that of steel is 200 GPa, then a 100 MPa increase in pressure will induce an apparent expansion of 19 micrometers or an apparent expansion of the sample of 760 microstrains.

Measuring the effect of pressure on the ring is more complex than that of temperature because the range of elastic moduli is smaller than the range of thermal expansion coefficients. Thus, the calibration specimen must be well characterized, since it is not essentially negligible as in the thermal calibration using quartz. One procedure is to determine the elastic properties of a calibration sample by applying uniaxial stress and measuring the resultant strains. Diametric strains can be measured using the ring gage whose pressure effect is to be determined. Assuming isotropy, the results from the uniaxial stress test can be used to compute the bulk modulus of the calibration specimen. Then with the ring gage still mounted on the sample, the assembly is pressurized. The difference between the observed displacement and that calculated for the sample using the independently measured sample bulk modulus is the pressure effect on the ring.

In one experiment, samples of 15-5 stainless steel and 6061 aluminum, 2.54 centimeters in diameter were tested. Axial strains were measured with a pair of LVDTs mounted parallel to the sample axis. The LVDT barrels were held by an aluminum ring attached near the top of the sample, while the cores were attached by their rods to a similar ring near the bottom of the sample. Axial shortening of the sample moved the mounting rings closer together which was then sensed by the LVDTs. Table 1 summarizes the results of the tests for the moduli and the pressure effects.

TABLE 1

| | | Pressure Effects | | | |
|---|---|---|---|---|---|
| Material | K GPa | Observed Compression $10^{-6}$ cm MPa$^{-1}$ | Calculated Compression $10^{-6}$ cm MPa$^{-1}$ | Difference (Observ.-Calc.) $10^{-6}$ cm MPa$^{-1}$ | Predicted Difference $10^{-6}$ cm MPa$^{-1}$ |
| 6061 Al | 78.0 | 0.0 | +10.8 | −10.8 | −12.8 |
| 15-5 Steel | 235 | −5.0 | +3.6 | −8.6 | −12.8 |

| Contribution To Predicted Differences By Each Gage Component | | |
|---|---|---|
| Gage Component | Size (cm) | Apparent Compression ($\times 10^{-6}$ cm MPa$^{-1}$) |
| Aluminum Ring | 4.2 | −17.9 |
| Steel Screw and Rod | 2.2 | +3.1 |
| LVDT | — | +2.0 |
| Total correction to subtract from observed | | −12.8 |

The possibility that the LVDT is affected by pressure was also tested by replacing the lear spring, adjusting screw and connecting rod with a rod of 6061 aluminum. The rod length and LVDT barrel were adjusted so the core was held at the null point while the barrel was held at its physical center, by the set screw. In this position the effect of pressure on the ring and rod cancel. There was a pressure effect of about $2 \times 10^{-6}$ cmMPa$^{-1}$, with some hysteresis between pressurizing and depressurizing.

A further, small effect is the adiabatic heating of the aluminum and steel. For small changes in temperature, and assuming that the material properties remain constant over the relevant pressure range, the temperature change $\Delta T$ is given by $$\Delta T = \frac{\beta v T}{C_p} \Delta P,$$

where $\beta$ is the compressibility, $v$ is the specific volume, T is the average temperature in °K, $C_p$ is the specific heat and $\Delta P$ is the pressure change. For aluminum, starting at 27° C. and increasing the pressure by 100 MPa, the temperature increased by about 1° C. For steel, the corresponding increase is 0.25° C. Adiabatic heating of the ring and sample cannot be avoided by rapid pressurization and depressurization. Apparent displacements would be small and basically reversible. To the extent that the process was not truly adiabatic, a small hysteresis loop would be induced in the observed displacements.

Figure 8:
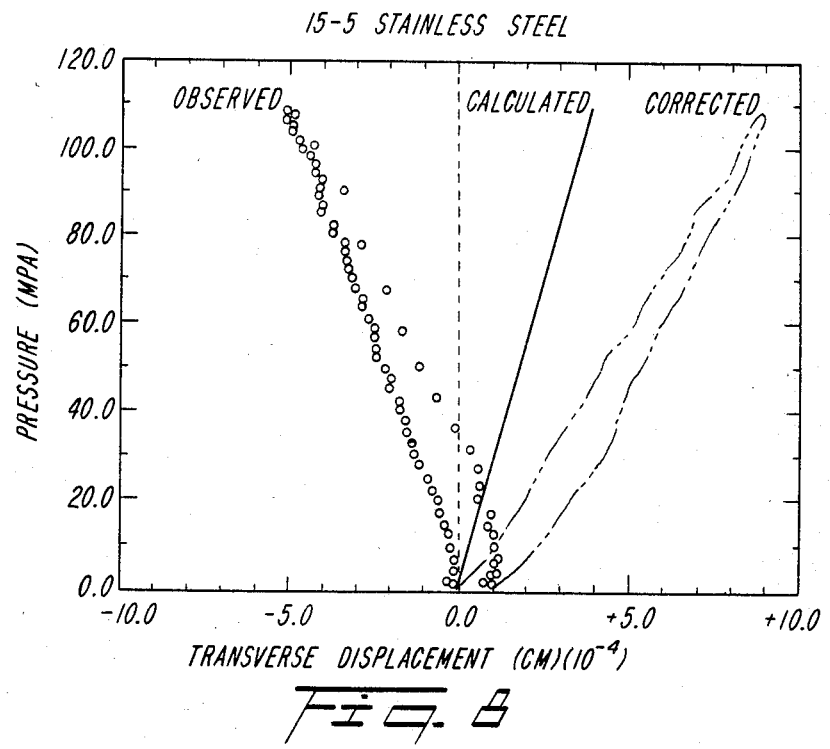
Figure 9:
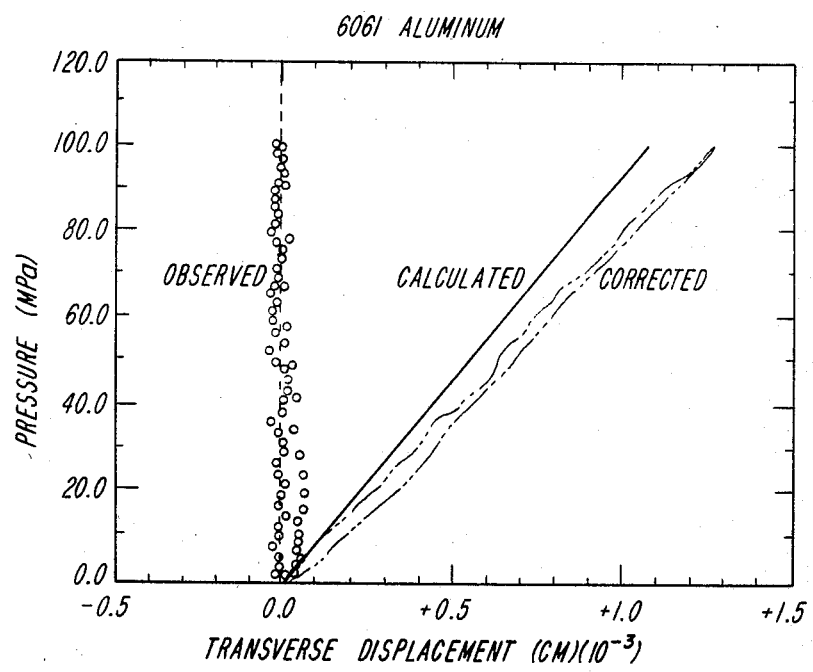

In FIGS. 8 and 9, the results of a pressure cycle on the gaged samples are shown. To minimize thermal effects, the pressure cycle was completed in about 30 seconds. Adiabatic heating and cooling of the oil did not have time to significantly change the ring temperature. Circles indicate the observed pressure induced compression of the samples, with no correction for pressure effects on the gage. For uncorrected results, the steel sample appeared to have expanded under pressure. Calculated compression of the samples, using the previously determined moduli, is shown by the solid line. After adding a correction calculated using equation 2 supra, and including the pressure effect on the LVDT, the corrected data is shown by the dashed line.

As Table 1 shows, the observed effect of pressure on the ring was an apparent sample expansion of $9.7 \times 10^{-6}$ cmMPa$^{-1}$, taking the average of the results for the steel and aluminum calibration sample. The calculated pressure effect for the ring gage was an apparent sample expansion of $12.8 \times 10^{-6}$ cmMPa$^{-1}$. For a sample with a diameter of 2.54 centimeters, the observed pressure effect on the ring gage corresponds to an expansion strain of 3.8 microstrains per MPa. Agreement between the calculated and observed pressure effect is not good enough to justify making a correction based on the calculations. The actual observed pressure effect should be used. Using the observed pressure effect, the gage can be corrected for pressure with an uncertainty given by the difference in values obtained for aluminum and steel, which vary from the mean by about $1 \times 10^{-6}$ cmMPa$^{-1}$.

As with thermal effects, compensation for pressure effects can be accomplished by using a stiff material for the ring and more compliant materials for the adjusting screw and rod. For materials suitable for gages it is difficult to get a stiffness ratio greater than about three to one, so compensation will not be complete for larger ring sizes. Use of steel for the ring will reduce the pressure effect by a factor of three, even before compensation and correction.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best explain the principles of the invention and its practical application to thereby enable one of ordinary skill in the art to best utilize the invention and various embodiments and with various modifications as are suited to the particular use contemplated. It is intended that the scope of the invention be defined by the claims appended hereto.

What is claimed is:

1. A gage for measuring strain in a rock sample, comprising:
   (a) a mounting ring having an inner diameter slightly greater than the diameter of said sample;
   (b) means for mounting said ring on said sample, said mounting means including an adjustment means providing a first point of contact between the ring and sample, and attachment means connected to the ring for providing a second point of contact between the ring and sample, said attachment means being generally immovable in a direction perpendicular to the plane of said ring to support the weight of the ring on the sample, said attachment means being yieldable diametrically by a distance equal to a change in the diameter of the sample in response to diametric strain in the rock sample; and (c) sensor means including strain transmitting means in contact with said attachment means for accurately transmitting movement of said attachment means caused by strain in the rock sample to said sensor means producing a variable output in proportion to strain, said strain transmitting means being independent of forces acting upon said attachment means and thereby being isolated from said forces by said attachment means.

2. The gage of claim 1, wherein said first and second points of contact are diametrically opposed to each other.

3. The gage of claim 2, wherein said adjustment means includes an adjustment screw and said attachment means includes a leaf spring attached at opposite ends thereof to the inner periphery of the mounting ring, an intermediate portion of the leaf spring projecting radially inward from said opposite ends to define said second point of contact.

4. The gage of claim 3, wherein said end portions of the leaf spring are convex at the inner periphery of said ring between the attachment ends of said leaf spring, an intermediate portion of said leaf spring being concave at said inner periphery and projecting radially inward to define said second contact point.

5. The gage of claim 4, wherein said intermediate portion includes a dimple projecting radially inward to define said second contact point.

6. The gage of claim 5, wherein said strain transmitting means is a rod having a free end received in a depression formed within the dimple and facing towards the inner periphery of said ring, and wherein said sensor means includes a linear variable differential transformer having a barrel housing fixed to said ring and a core within the barrel connected co-axial to the rod.

7. The gage of claim 6, wherein said free end of the rod is fixed within said depression and is movable in response to changes in the diameter of said sample.

8. The gage of claim 4, wherein said second point of contact is a pointed tip soldered to the intermediate portion of said leaf spring adapted to face the sample.

9. The gage of claim 6, wherein said rod and adjustment screw are made of a material having a higher coefficient of thermal expansion than the material of said ring so that thermal expansion of said rod and screw balances thermal expansion of said ring to prevent false indication of strain due to temperature changes.

10. A gage for measuring strain in a rock sample, comprising a mounting ring having an inner diameter slightly greater than the outer diameter of said sample; means for mounting said ring to said sample, said mounting means including an adjustment screw providing a first point of contact between the ring and sample and a leaf spring having opposite ends fixed to the inner periphery of said ring and an intermediate portion projecting radially inward from said ring to define a second point of contact between the ring and sample, said first and second points of contact being diametrically opposed to each other, said adjustment screw and leaf spring supporting the weight of said mounting ring on the sample so that the leaf spring is generally immovable in a direction perpendicular to the plane of said ring and movable diametrically by a distance equal to a change in the diameter of the sample; and a linear variable differential transformer having a barrel housing mounted to the ring and a rod having one end connected to a spring-loaded core movable within the barrel and a free end extending between the inner periphery of the ring into contact with the intermediate portion of said leaf spring, whereby diametric deflection of said leaf spring by a distance equal to a change of diameter of said sample causes proportional movement of said rod and core for producing a variable output in proportion to strain of said sample.

11. The gage of claim 3, wherein said leaf spring extends within the plane of said ring.

* * * * *